UNITED STATES PATENT OFFICE

ARTHUR LÜTTRINGHAUS, OF MANNHEIM, AND WILHELM BRAREN, OF LUDWIGS-HAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION.

VAT DYES AND MAKING THE SAME.

1,035,023.      Specification of Letters Patent.      Patented Aug. 6, 1912.

No Drawing.      Application filed April 18, 1912. Serial No. 691,715.

*To all whom it may concern:*

Be it known that we, ARTHUR LÜTTRINGHAUS and WILHELM BRAREN, subjects the first of the King of Prussia and the second of the King of Bavaria, residing, respectively, at Mannheim and Ludwigshafen-on-the-Rhine, Germany, have invented new and useful Improvements in Vat Dyes and Making the Same, of which the following is a specification.

We have found that those anthracridones in which two anthraquinone residues (either substituted or not) are joined together by an acridone ring and in which the carbonyl group of the acridone ring stands in the position of a gamma diketone to the carbonyl of an anthraquinone residue, as illustrated by the formula:—

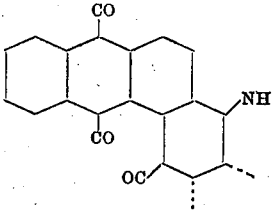

can be converted into valuable new vat coloring matters by treatment with hydrazin.

Our new coloring matters are characterized by consisting, when dry, of dark powders which are practically insoluble in the ordinary organic solvents, they yield bluish red solutions in concentrated sulfuric acid, brown vats with alkaline hydrosulfite, and dye cotton from gray to violet shades of excellent fastness.

The following examples will serve to illustrate further the nature of our invention and how it can be carried into practical effect, but the invention is not confined to these examples. The parts are by weight.

Example 1: Heat together, for 8 hours, at about 120° C., 5 parts of the anthracridone obtainable from 3-amino-4-methyl-diphenyl-ketone-2'-carboxylic acid and 1-chlor-antharquinone-2-carboxylic acid (see the specification of British Patent No. 894/11), 5 parts of hydrazin hydrate (or the corresponding quantities of hydrazin sulfate and caustic soda) and 250 parts of cresol. Then filter off the reaction product, which separates out in the form of small dark crystals. Wash them with cresol and alcohol and dry them. They are practically insoluble in the ordinary organic solvents, but yield an intense bluish red solution in concentrated sulfuric acid.

With alkaline hydrosulfite the new coloring matter gives a brown vat which dyes cotton gray shades of excellent fastness.

Example 2: Heat together, for 8 hours, at from 120° to 130° C., 5 parts of the anthracridone obtainable from 3-amino-4-chlor-diphenyl-ketone-2'-carboxylic acid and 1-chlor-anthraquinone-2-carboxylic acid (see the aforesaid British Patent No. 894/11), 5 parts of hydrazin hydrate and 250 parts of cresol. When the reaction product is cold, filter off the coloring matter, wash it with cresol and alcohol, and dry it. A reddish black powder is obtained which is practically insoluble in the ordinary organic solvents, but yields a brownish vat with alkaline hydrosulfite, which vat colors cotton brown shades which, upon oxidation in the air, give rise to a full violet of excellent fastness. It yields a bluish red solution in concentrated sulfuric acid.

In a similar manner, vat coloring matters can be obtained from other anthracridones having the aforesaid structure.

Now what we claim is:—

1. The process of producing vat coloring matters of the anthraquinone series by condensing with hydrazin a dianthraquinone-acridone in which the carbonyl group of the acridone ring stands in the position of a gamma-diketone to the carbonyl of an anthraquinone residue.

2. The process of producing vat coloring matter of the anthraquinone series by condensing hydrazin hydrate with the anthracridone obtainable from 3-amino-4-methyl-diphenyl-ketone-2'-carboxylic acid and 1-chlor-anthraquinone-2-carboxylic acid.

3. The new vat coloring matters which can be obtained by treating with hydrazin a dianthraquinone-acridone in which the carbonyl group of the acridone ring stands in the position of a gamma diketone to the carbonyl of an anthraquinone residue, which new coloring matters consist, when dry, of dark powders which are practically insoluble in the ordinary organic solvents, which yield bluish red solutions in concentrated sulfuric acid, brown vats with alkaline hydrosulfite, and dye cotton from gray to violet shades of excellent fastness.

4. The new vat coloring matter of the anthraquinone series which can be obtained by condensing hydrazin hydrate with the anthracridone obtainable from 3-amino-4-methyl-diphenyl-ketone-2'-carboxylic acid and 1-chlor-anthraquinone-2-carboxylic acid, which new coloring matter can be obtained in the form of dark crystals which are insoluble in the ordinary organic solvents, but yield an intense bluish red solution in concentrated sulfuric acid and a brown vat with alkaline hydrosulfite and dye cotton gray shades of excellent fastness.

In testimony whereof we have hereunto set our hands in the presence of two subscribing witnesses.

ARTHUR LÜTTRINGHAUS.
WILHELM BRAREN.

Witnesses:
ERNEST G. EHRHARDT,
JOS. PEIFFER.